March 16, 1971 — M. SPERTUS — 3,570,160
WIDE WIDTH METAL PHOTO FRAME AND MOLDING STRIP
Filed Feb. 17, 1969
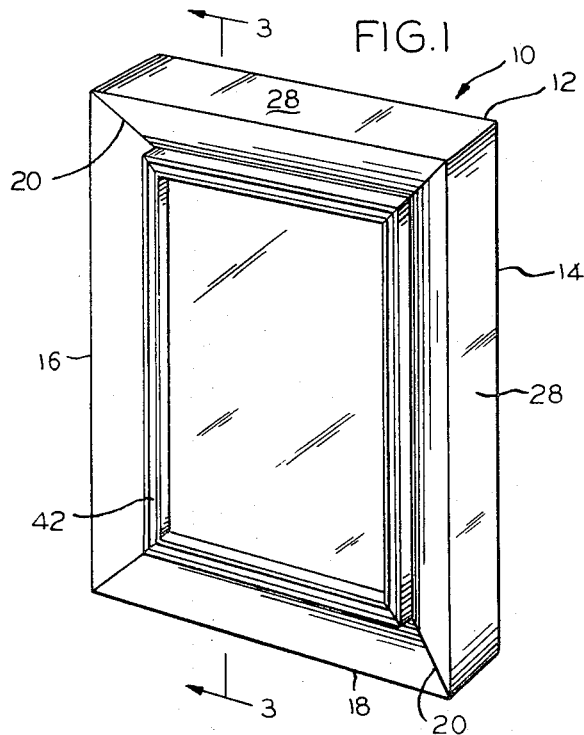
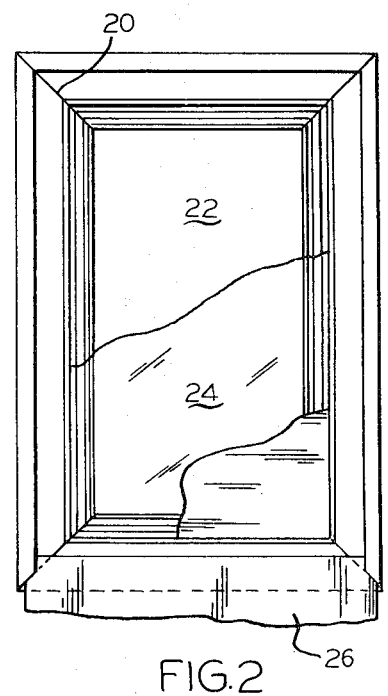
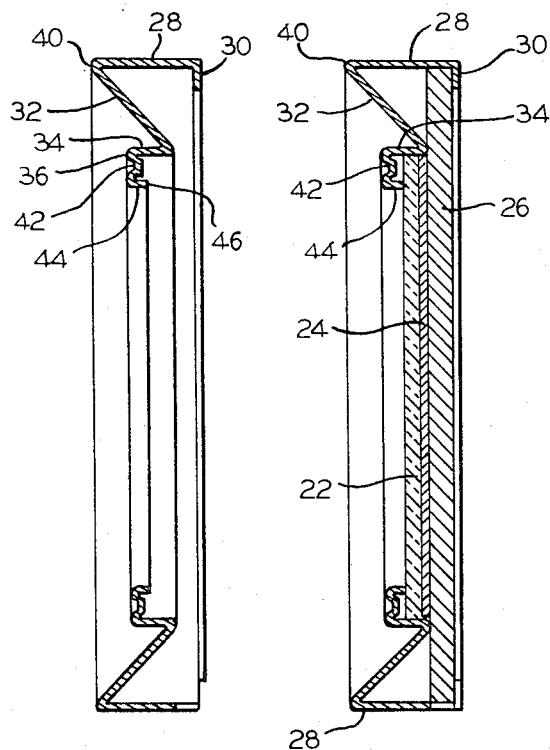
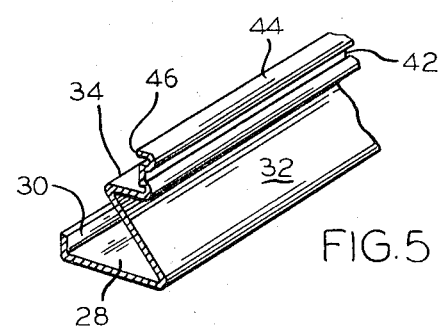
INVENTOR
MAURICE SPERTUS
BY Eli Mullin
ATTORNEY United States Patent Office 3,570,160
Patented Mar. 16, 1971

3,570,160
WIDE WIDTH METAL PHOTO FRAME AND MOLDING STRIP
Maurice Spertus, Highland Park, Ill., assignor to Intercraft Industries Corporation
Filed Feb. 17, 1969, Ser. No. 799,846
Int. Cl. G09f 1/12
U.S. Cl. 40—152                                    1 Claim

ABSTRACT OF THE DISCLOSURE

A photo frame molding strip and photo frame made thereof has an intermediate abutment wall made by so forming the molding strip as to afford the abutment wall while simultaneously achieving a shadow-box effect. The marginal edges of the photograph and the covering glass pane abut the intermediate wall, thereby limiting the distance it protrudes into the molding frame sides.

BACKGROUND OF THE INVENTION

This invention relates generally to photo or picture frame moldings and frames made therefrom and more particularly to improvements in such frames and moldings as disclosed in my Pat. No. 3,388,491 entitled, "Large Width Metal Picture Frames and Corner Joint Therefor," issued June 18, 1968.

As disclosed in the aforementioned patent, the picture frame and molding strip disclosed therein comprise a single strip of metal of substantially channel-shaped cross-section, miter-cut and bent into a predetermined picture frame shape having mitered joints at the corners thereof. In order to effect a picture frame molding strip of substantial width which was capable of mounting therein a picture, the dimensions of which were considerably less than the over-all dimensions of the picture frame, an intermediate portion of the picture frame molding strip was crimped and doubled back on itself to afford a ledge against which the marginal edges of the picture and glass could abut. This, of course, limited the distance which the picture and glass protruded into the picture frame molding.

Although the above-described construction served the purpose intended, it neverthless and certain disadvantages which limited the more universal use of such a construction. Thus, for example, it was found that in many cases it was necessary to weld the crimped portions together in order to achieve the necessary stability. Moreover, special dies were required and manufacturing costs were substantially greater than anticipated.

Because of the crimping requirement, the styles and designs of the picture frames and moldings were likewise limited. Thus, for example, the angle of incline of the front segment of the picture frame was limited to the extent where it was impossible to achieve the sometimes highly desirable shadow-box effect now currently popular in frames of this type.

Another disadvantage was that decorative strips of precious metals or the like to encircle and delineate the marginal borders of the visible portion of the picture or photograph, such as is now currently in vogue, could not be readily adapted to the picture frames of the aforementioned patent.

It is, therefore, an important object of this invention to provide a photo frame molding strip and a photo frame made therefrom which will overcome all of the disadvantages mentioned hereinabove. An object relating thereto is to afford an intermediate ledge without necessitating the actual crimping of an intermediate portion of the picture frame molding.

Another object is to afford a picture frame molding strip having an intermediate abutment wall formed by bending or extruding the molding strip in an acute angle so that the abutment wall is parallel to the outer wall segment of the molding strip but spaced therefrom at any predetermined distance.

A further object is to form the inner end of the front wall segment of the molding strip with a groove capable of accommodating therein a strip of decorative material such as, for example, a strip of precious metal. Such a strip forms a marginal frame within the photo frame which delineates and emphasizes the photograph or picture framed therein.

Still another object is to afford a picture frame molding of substantial width with an intermediate ledge as described hereinabove but in which the outer edge of the ledge is positioned inwardly from the outermost portion of the front wall segment of the molding strip so as to achieve the appearance of a shadow-box frame.

Yet a further object of this invention is to provide a metal photo frame which permits the photograph to be readily and properly centered regardless of the width or depth of the frame molding.

Yet another object of the invention is to afford a photo frame molding strip and a photo frame made therefrom which may be manufactured on a mass production basis at low cost as, for example, by extruding, and which eliminates the necessity for welding or otherwise reinforcing the intermediate ledge portion of the molding strip.

With the foregoing and other objects and features in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacirficing any of the advantages of the invention.

BRIEF DESCRIPTION OF THE DRAWINGS

For the purpose of facilitating and understanding of my invention, I have illustrated in the accompanying drawings a preferred embodiment thereof, from an inspection of which, when considered in connection with the following description, my invention, its mode of construction, assembly and operation and many of its advantages should be readily understood and appreciated.

Referring to the drawings in which the same characters of reference are employed to indicate corresponding or similar parts throughout the several figures of the drawings:

FIG. 1 is a perspective view showing in front elevation a photo frame embodying the principles of my invention;

FIG. 2 is a rear view of the photo frame with portions removed to show the several elements of the framed photograph;

FIG. 3 is a cross-sectional view taken on the plane of line 3—3 in FIG. 1 of the drawings and viewed in the direction indicated;

FIG. 4 is a view similar to FIG. 3 but showing only the molding strip portion of the photo frame; and FIG. 5 is an enlarged fragmentary perspective view of the molding frame strip such as is used to construct all except the bottom wall of the photo frame.

DESCRIPTION OF THE PREFERRED EMBODIMENT

Referring to the several figures of the drawings, it will be noted in FIG. 1 of the drawings that reference numeral 10 indicates generally a photo frame constructed in accordance with the principles of the present invention and comprising a rectangular-shaped frame having a top wall 12, a pair of side walls 14 and 16 and a bottom wall 18. The aforementioned walls may be formed from a single strip of molding strip which may be either formed by bending or extruding and is of substantially channel-shape as shown in FIGS. 3, 4, and 5 of the drawings. The molding strip is miter-cut and bent at spaced intervals to form corner joints 20 in which the adjacent wall members abut each other in close relationship As shown in FIGS. 2 and 3 of the drawings, the enclosure or frame formed by the molding strip walls afford a structure into which may be inserted the various members of the frame photograph or picture. Thus, as seen in FIG. 3 of the drawings, the framed photograph includes a pane of glass 22, the photograph or picture itself 24, and a supporting backing member 26 which may be made from any desirable material such as, for example, cardboard or the like. The structure and manner in which the members of the framed photograph are assembled will be disclosed as the description proceeds.

Turning now to the structure of the molding strip itself, it will be noted that all three walls except one (usually the bottom), comprises an outer side segment 28 having an integrally formed rear segment 30 substantially perpendicular thereto and an inclined front segment 32 integrally formed as shown in FIGS. 3, 4 and 5 of the drawings. The inclined front segment 32 extends inwardly and may be of any dimension as desired. At the inner end thereof, a segment 34 is integrally formed in substantially parallel spaced relationship with the outer wall 28 but of a dimension substantially less than the depth of said outer wall 28. Moreover, the outer end 36 of said inner segment 34 is spaced substantially inward from the front edge 40 of the outer side wall segment 28 as shown in FIGS. 3 and 4 of the drawings. The segment 34 affords an abutment wall, the purpose of which will become apparent as the description proceeds.

The free end of the front wall segment of the molding strip may then be further formed to afford a marginal groove 42 and finally the free end of the molding strip is formed inwardly to afford the segment 44, the inner end 46 of which abuts the glass 22 as shown in FIG. 3 of the drawings.

It will be noted in FIGS. 2, 3 and 4 of the drawings, that the rear segment 30 of the molding strip is omitted in the bottom frame wall 18. The purpose thereof is to enable the readily insertion into the frame of the various frame photo members including the glass 22, the photograph 24 and the backing member 26.

As noted in FIG. 3 of the drawings, the marignal edges of the glass 22 and the photograph 24 abut the abutment wall 34 of the intermediate portion of the molding strip and is thereby limited in the distance in which it may protrude into the frame itself. Thus, a photograph of relatively small dimension may be mounted within the frame which is of substantially greater dimension than that of the photograph. This, of course, provides an illusion or effect in which the photograph appears considerably larger than it actually is.

The angle of inclination of the front wall segment 32 may be varied as desired. However, it is preferable that it be such that the over-all effect of the frame is to provide what appears to be a shadow-box type frame.

The groove 42 which encircles the marginal edges of the photograph provides a means within which may be inserted strips of decorative materials such as precious metal or contrasting pearlized plastic which emphasizes and enhances the beauty of the framed photograph.

I have found that the construction described hereinabove affords sufficient stiffness so that it is unnecessary to weld or in any other manner provide auxiliary means for strengthening the molding frame strip. At the same time, by eliminating the necessity for welding, special crimping dies and other unnecessary manufacturing operations, the cost of construction is considerably reduced.

It is believed that my invention, its mode of construction and assembly and many of its advantages, should be readily understood from the foregoing without further description, and it should also be manifest that while a preferred embodiment of the invention has been shown and described for illustrative purposes, the structural details are nevertheless capable of wide variation within the purview of my invention as defined in the appended claim.

What I claim and desire to secure by Letters Patent of the United States is:

1. A photo frame comprising:
   a length of substantially channel shaped moulding strip mitered and bent to afford a four-sided frame;
   each side of said frame having at least a side wall segment, an inwardly inclined front wall segment integrally formed therewith and an intermediate segment integrally formed at the inner end of said front wall segment;
   said intermediate segment positioned in a plane parallel to and spaced from said side wall segment and forming an acute angle with said front wall segment, whereby a shadow box effect is achieved;
   said intermediate segment adapted to abut the marginal edges of a photograph positioned in said photo frame.

References Cited

UNITED STATES PATENTS

| | | | |
|---|---|---|---|
| 2,131,115 | 9/1936 | Naisuler | 52—716 |
| 3,294,463 | 12/1966 | Kafferlin et al. | 40—10X |

ROBERT W. MICHELL, Primary Examiner

W. J. CONTRERAS, Assistant Examiner